(12) United States Patent
Axelson et al.

(10) Patent No.: US 11,768,514 B2
(45) Date of Patent: Sep. 26, 2023

(54) PEDAL SYSTEM FOR ROAD AND FLIGHT OPERATIONAL USE VEHICLE

(71) Applicants: CHENGDU AEROVAN TECHNOLOGY CO., LTD, Chengdu (CN); Zhejiang Geely Holding Group Co., Ltd., Zhejiang (CN)

(72) Inventors: Gustaf Axelson, Västra Frölunda (SE); Jonathan Johansson, Gothenburg (SE)

(73) Assignees: CHENGDU AEROVAN TECHNOLOGY CO., LTD, Chengdu (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 17/952,287

(22) Filed: Sep. 25, 2022

(65) Prior Publication Data
US 2023/0018708 A1     Jan. 19, 2023

Related U.S. Application Data

(63) Continuation of application No. PCT/CN2021/089090, filed on Apr. 22, 2021.

(30) Foreign Application Priority Data

Apr. 22, 2020 (EP) .................................. 20170752

(51) Int. Cl.
*G05G 1/30* (2008.04)
*B64C 13/04* (2006.01)
(Continued)

(52) U.S. Cl.
CPC .............. *G05G 1/305* (2013.01); *B60K 26/02* (2013.01); *B60T 7/06* (2013.01); *B64C 13/044* (2018.01);
(Continued)

(58) Field of Classification Search
CPC ............ G05G 1/30; G05G 1/305; G05G 1/36; Y10T 74/208; Y10T 74/20894;
(Continued)

(56) References Cited

U.S. PATENT DOCUMENTS

| 1,919,930 A | * | 7/1933 | Cash | B60W 10/02 |
|  |  |  |  | 477/214 |
| 2,542,410 A | * | 2/1951 | Hedges | B60W 10/18 |
|  |  |  |  | 74/478 |

(Continued)

FOREIGN PATENT DOCUMENTS

| CN | 109484109 A | 3/2019 |
| CN | 110225836 A | 9/2019 |

(Continued)

OTHER PUBLICATIONS

International Search Report from International Application No. PCT/CN2021/089090, dated Jul. 21, 2021, 2 pages.

*Primary Examiner* — Adam D Rogers

(57) ABSTRACT

A pedal system for a vehicle, where the vehicle is configured for operating in a first vehicle mode for flight operational use and a second vehicle mode for road operational use. The pedal system includes a first pedal arrangement having a first lower pedal part and a first upper pedal part arranged in connection to each other. In the first vehicle mode the first lower pedal part is configured for activating a rudder function of the vehicle, and in the first vehicle mode the first upper pedal part is configured for activating a braking function of the vehicle. In the second vehicle mode the first lower pedal part and the first upper pedal part are configured for cooperating with each other to activate a throttle function of the vehicle.

14 Claims, 6 Drawing Sheets

(51) Int. Cl.
  *B60K 26/02* (2006.01)
  *B60T 7/06* (2006.01)
  *B64C 37/00* (2006.01)
  *G05G 1/36* (2008.04)
  *B60F 5/02* (2006.01)

(52) U.S. Cl.
  CPC ............... *B64C 37/00* (2013.01); *B60F 5/02* (2013.01); *G05G 1/36* (2013.01)

(58) Field of Classification Search
  CPC ....... B64C 13/044; B64C 13/50; B64C 37/00; B60K 26/02; B60T 7/06; B60F 5/02
  See application file for complete search history.

(56) References Cited

U.S. PATENT DOCUMENTS

| | | | |
|---|---|---|---|
| 2,553,080 A * | 5/1951 | Ching, Sr. | ............. G05G 1/305 D12/174 |
| 4,986,493 A | 1/1991 | Sarh | |
| 5,121,889 A | 6/1992 | Carey, Jr. | |
| 5,836,541 A | 11/1998 | Pham | |
| 5,957,811 A * | 9/1999 | Gustafsson | ............ B60K 26/02 477/214 |
| 5,984,228 A * | 11/1999 | Pham | ...................... B64C 37/00 244/49 |
| 6,129,306 A * | 10/2000 | Pham | ...................... B64C 37/00 244/50 |
| 7,032,471 B2 * | 4/2006 | Weber | ...................... F15B 13/14 74/491 |
| 9,501,083 B2 * | 11/2016 | Zhou | ...................... F02D 11/02 |
| 10,196,130 B2 | 2/2019 | Gemmati | |
| 2020/0094638 A1 * | 3/2020 | Macandrew | ........ B64C 13/0421 |

FOREIGN PATENT DOCUMENTS

| | | | | |
|---|---|---|---|---|
| EP | 3335914 A1 | 6/2018 | | |
| EP | 3335915 A1 | 6/2018 | | |
| EP | 3412560 B1 | 2/2020 | | |
| WO | WO-2004006039 A1 * | 1/2004 | ............. | G05G 1/305 |
| WO | 2016057003 A2 | 4/2016 | | |
| WO | WO-2018108947 A1 * | 6/2018 | ............... | B60F 5/02 |

* cited by examiner

PEDAL SYSTEM FOR ROAD AND FLIGHT OPERATIONAL USE VEHICLE

RELATED APPLICATION DATA

This application is a continuation of International Patent Application No. PCT/CN2021/089090, filed Apr. 22, 2021, which claims the benefit of European Patent Application No. 20170752.8, filed Apr. 22, 2020, the disclosures of which are incorporated herein by reference in their entireties.

TECHNICAL FIELD

The present disclosure relates to a pedal system for a vehicle, where the vehicle is configured for operating in a first vehicle mode for flight operational use and a second vehicle mode for road operational use.

BACKGROUND

Flying cars are becoming increasingly popular, and vehicle constructions suitable for both flight operational use and road operational use are attaining focus from different vehicle manufacturers. Today, pedals on airplanes commonly have a setup with dual functions different from road operational use vehicles. A side rudder function is arranged in the bottom part of the pedal and a brake function is arranged in the top part of the pedal. The airplane pedal setup is also suitable for vehicles configured for both flight operational use and road operational use when operating in an air mode or in a flight mode. However, the airplane pedal setup is not suitable for the vehicle when operating in a road mode. In order to conform to current pedal standards, vehicles configured both for flight operational use and road operational use are equipped with different sets of pedals for the different operating modes. When shifting between air mode and road mode, the pedal setup is also shifted to suit the operational mode of the vehicle. The shifting of the pedal setup is often a complicated and time-consuming process. Further, the pedal arrangements are often costly.

There is thus a need for an improved pedal system for vehicles, where the vehicles are configured for operating in a first vehicle mode for flight operational use and a second vehicle mode for road operational use.

SUMMARY

An object of the present disclosure is to provide a pedal system for a vehicle where the previously mentioned problems are avoided, where the vehicle is configured for operating in a first vehicle mode for flight operational use and a second vehicle mode for road operational use. This object is at least partly achieved by the features of the independent claims. The dependent claims contain further developments of the pedal system.

The disclosure concerns a pedal system for a vehicle, where the vehicle is configured for operating in a first vehicle mode for flight operational use and a second vehicle mode for road operational use. The pedal system comprises a first pedal arrangement having a first lower pedal part and a first upper pedal part arranged in connection to each other. In the first vehicle mode, the first lower pedal part is configured for activating a rudder function of the vehicle and the first upper pedal part is configured for activating a braking function of the vehicle. In the second vehicle mode, the first lower pedal part and the first upper pedal part are configured for cooperating with each other to activate a throttle function of the vehicle.

Advantages with these features are that the same pedals can be used both flight operational use and road operational use. By configuring the pedals both for flight operational use and road operational use, the shifting of the pedal setup is less complicated and time-consuming. Further, the pedal arrangement of the vehicle can be made more cost efficient when using the same pedal parts for flight operational use and road operational use. The first pedal arrangement can be used as the right pedal in the first vehicle mode for a combined rudder and brake function during flight operational use, and through the cooperation of the pedal parts in the second vehicle mode as a throttle pedal with a throttle function during road operational use. The same first pedal arrangement is thus being operated in both flight operational use and in road operational use. This configuration is for example suitable when using electronic pedal functions, where the pedals are electrically operated with wire connections to the respective vehicle functions. Sensors may for example be used for triggering the vehicle functions. In the first vehicle mode, the pedal arrangement is disconnected from the throttle function and the pedal arrangement is operated as a traditional pedal for flight use. In the second vehicle mode, the pedal arrangement is disconnected from the rudder and brake functions, and the pedal arrangement is operated as a conventional throttle pedal for road vehicles.

According to an aspect of the disclosure, the first lower pedal part and the first upper pedal part are movably arranged in relation to each other in the first vehicle mode. The first lower pedal part and the first upper pedal part are configured for being displaced in relation to each other in the first vehicle mode for activating the braking function. The first lower pedal part and the first upper pedal part are non-movably arranged in relation to each other in the second vehicle mode. The first lower pedal part and the first upper pedal part are configured for being displaced as a single pedal unit in the second vehicle mode. The movable arrangement of the first lower pedal part and the first upper pedal part in relation to each other in the first vehicle mode is providing a pedal setup that is the same as the one in conventional airplanes. The first upper pedal part can be displaced in relation to the first lower pedal part for braking action, and the first lower pedal part can be used for the rudder function. Through the displacement as a single pedal unit in the second vehicle mode, the throttle pedal function during road operational use is the same as a traditional throttle pedal for road vehicles, with the same feeling for the driver of the vehicle. Because the first lower pedal part and the first upper pedal part are non-movably arranged in relation to each other, the pedal during road operational use is configured as a conventional throttle pedal.

According to another aspect of the disclosure, the first lower pedal part is connected to a first electric actuator and the first upper pedal part is connected to a second electric actuator. The first lower pedal part and the first upper pedal part are configured for being electrically controlled independently of each other upon activation in the first vehicle mode. The first lower pedal part and the first upper pedal part are configured for being electrically controlled interdependently of each other upon activation in the second vehicle mode. The first and second electric actuators are securing an efficient control of the different pedal functions in the different modes. The independent control in the first vehicle mode is securing the braking and rudder functions, and the interdependent control in the second vehicle mode is establishing the throttle pedal functionality with conventional handling during use.

According to a further aspect of the disclosure, the first lower pedal part is pivotally connected to the first electric actuator via a first connection member. The first lower pedal part is configured to rotate around a first rotational axis upon activation. The first upper pedal part is pivotally connected to the second electric actuator via a second connection member. The first upper pedal part is configured to rotate around a second rotational axis upon activation. The first and second connection members may for example be arranged as shafts or levers establishing the necessary pivoting and rotating pedal functions, and the connections to the actuators are securing the different vehicle functions. The system is suitable for vehicles having drive-by-wire constructions or systems, where the systems and functions of the vehicles are electrically operated without any mechanical connections between the actuators and the rudders, brakes, and throttles of the vehicles. However, mechanical connections can be arranged if suitable, depending on the design and construction of the vehicles According to an aspect of the disclosure, the first rotational axis is parallel to, or essentially parallel to, the second rotational axis. This configuration of the first and second rotational axes is establishing a simple design and setup of the pedal system.

According to another aspect of the disclosure, the first rotational axis and the second rotational axis are coaxially arranged in relation to each other. The first lower pedal part and the first upper pedal part are configured to work as one pedal unit following a path corresponding to a pivoting movement around the first rotational axis and the second rotational axis in the second vehicle mode. The coaxial arrangement of the first rotational axis and the second rotational axis is simplifying the construction of the pedal system for minimizing the number of components used, and further for providing an efficient pedal design suitable for the different operational vehicle modes, where the pedal arrangement is following a path corresponding to a pivoting movement around the coaxially arranged first and second rotational axes in the second vehicle mode.

According to a further aspect of the disclosure, the first lower pedal part is pivotally connected to the first upper pedal part via the second connection member. The first pedal arrangement further comprises a first locking mechanism. The first locking mechanism is configured for allowing a pivotal movement between the first lower pedal part and the first upper pedal part in the first vehicle mode. The first locking mechanism is configured for preventing a pivotal movement between the first lower pedal part and the first upper pedal part in the second vehicle mode. The first lower pedal part and the first upper pedal part are configured to work as one pedal unit following a path corresponding to a pivoting movement around the first rotational axis in the second vehicle mode. In this alternative embodiment, the pivotal connection between the first lower pedal part and the first upper pedal part is providing a simple and efficient design of the first pedal arrangement, where the first locking mechanism is used for allowing or preventing the relative movements between the pedal parts in the respective operational vehicle modes.

According to an aspect of the disclosure, the pedal system further comprises a second pedal arrangement having a second lower pedal part and a second upper pedal part arranged in connection to each other. In the first vehicle mode, the second lower pedal part is configured for activating a rudder function of the vehicle. In the first vehicle mode, the second upper pedal part is configured for activating a braking function of the vehicle. In the second vehicle mode, the second lower pedal part and the second upper pedal part are configured for cooperating with each other to activate a braking function of the vehicle. Advantages with these features are that the same pedals can be used both flight operational use and road operational use. By configuring the pedals both for flight operational use and road operational use, the shifting of the pedal setup is less complicated and time-consuming. Further, the pedal arrangement of the vehicle can be made more cost efficient when using the same pedal parts for flight operational use and road operational use. The second pedal arrangement can be used as the left pedal in the first vehicle mode for a combined rudder and brake function during flight operational use, and through the cooperation of the pedal parts in the second vehicle mode as a brake pedal with a braking function during road operational use. The same second pedal arrangement is thus being operated in both flight operational use and in road operational use. This configuration is for example suitable when using electronic pedal functions, where the pedals are electrically operated with wire connections to the respective vehicle functions. Sensors may for example be used for triggering the vehicle functions. In the first vehicle mode, the pedal arrangement is disconnected from the braking function and the pedal arrangement is operated as a traditional pedal for flight use. In the second vehicle mode, the pedal arrangement is disconnected from the rudder and brake functions, and the pedal arrangement is operated as a conventional brake pedal for road vehicles.

According to another aspect of the disclosure, the second lower pedal part and the second upper pedal part are movably arranged in relation to each other in the first vehicle mode. The second lower pedal part and the second upper pedal part are configured for being displaced in relation to each other in the first vehicle mode for activating the braking function. The second lower pedal part and the second upper pedal part are non-movably arranged in relation to each other in the second vehicle mode. The second lower pedal part and the second upper pedal part are configured for being displaced as a single pedal unit in the second vehicle mode. The movable arrangement of the second lower pedal part and the second upper pedal part in relation to each other in the first vehicle mode is providing a pedal setup that is the same as the one in conventional airplanes. The second upper pedal part can be displaced in relation to the second lower pedal part for braking action, and the second lower pedal part can be used for the rudder function. Through the displacement as a single pedal unit in the second vehicle mode, the brake pedal function during road operational use is the same as a traditional brake pedal for road vehicles, with the same feeling for the driver of the vehicle. Because the second lower pedal part and the second upper pedal part are non-movably arranged in relation to each other, the pedal during road operational use is configured as a conventional brake pedal.

According to a further aspect of the disclosure, the second lower pedal part is connected to a third electric actuator and the second upper pedal part is connected to a fourth electric actuator. The second lower pedal part and the second upper pedal part are configured for being electrically controlled independently of each other upon activation in the first vehicle mode. The second lower pedal part and the second upper pedal part are configured for being electrically controlled interdependently of each other upon activation in the second vehicle mode. The third and fourth electric actuators are securing an efficient control of the different pedal functions in the different modes. The independent control in the first vehicle mode is securing the braking and rudder functions, and the interdependent control in the second vehicle mode is establishing the brake pedal functionality with conventional handling during use.

According to an aspect of the disclosure, the second lower pedal part is pivotally connected to the third electric actuator via a third connection member. The second lower pedal part is configured to rotate around a third rotational axis upon activation. The second upper pedal part is pivotally connected to the fourth electric actuator via a fourth connection member. The second upper pedal part is configured to rotate around a fourth rotational axis upon activation. The third and fourth connection members may for example be arranged as shafts or levers establishing the necessary pivoting and rotating pedal functions, and the connections to the actuators are securing the different vehicle functions. The system is suitable for vehicles having drive-by-wire constructions or systems, where the systems and functions of the vehicles are electrically operated without any mechanical connections between the actuators and the rudders and brakes of the vehicles. Mechanical connections may be arranged if suitable.

According to another aspect of the disclosure, the third rotational axis is parallel to, or essentially parallel to, the fourth rotational axis. This configuration of the third and fourth rotational axes is establishing a simple design and setup of the pedal system.

According to a further aspect of the disclosure, the third rotational axis and the fourth rotational axis are coaxially arranged in relation to each other. The second lower pedal part and the second upper pedal part are configured to work as one pedal unit following a path corresponding to a pivoting movement around the third rotational axis and the fourth rotational axis in the second vehicle mode. The coaxial arrangement of the third rotational axis and the fourth rotational axis is simplifying the construction of the pedal system for minimizing the number of components used, and further for providing an efficient pedal design suitable for the different operational vehicle modes, where the pedal arrangement is following a path corresponding to a pivoting movement around the coaxially arranged third and fourth rotational axes in the second vehicle mode.

According to an aspect of the disclosure, the second lower pedal part is pivotally connected to the second upper pedal part via the fourth connection member. The second pedal arrangement further comprises a second locking mechanism. The second locking mechanism is configured for allowing a pivotal movement between the second lower pedal part and the second upper pedal part in the first vehicle mode. The second locking mechanism is configured for preventing a pivotal movement between the second lower pedal part and the second upper pedal part in the second vehicle mode. The second lower pedal part and the second upper pedal part are configured to work as one pedal unit following a path corresponding to a pivoting movement around the third rotational axis in the second vehicle mode. In this alternative embodiment, the pivotal connection between the second lower pedal part and the second upper pedal part is providing a simple and efficient design of the second pedal arrangement, where the first locking mechanism is used for allowing or preventing the relative movements between the pedal parts in the respective operational vehicle modes.

According to another aspect of the disclosure, the first pedal arrangement and the second pedal arrangement are operatively connected to each other via a connection device. In the first vehicle mode, the second pedal arrangement upon displacement of the first pedal arrangement is configured for being displaced with the connection device in response to the displacement of the first pedal arrangement. In the first vehicle mode, the first pedal arrangement upon displacement of the second pedal arrangement is configured for being displaced with the connection device in response to the displacement of the second pedal arrangement. The connection device is efficiently establishing the connection between the pedal arrangements for securing the displacement of the respective pedal arrangement during flight operational use. The connection device is securing the same operation of the pedals in the first vehicle mode for flight operational use, as in conventional airplanes. When the first pedal arrangement is pushed by a user, the second pedal arrangement is moved in the opposite direction. When the second pedal arrangement is pushed by the user, the first pedal arrangement is moved in the opposite direction. The connection member is establishing the displacement function, which can be electrically operated with suitable actuators.

BRIEF DESCRIPTION OF THE DRAWINGS

The disclosure will be described in detail in the following, with reference to the attached drawings, in which.

DETAILED DESCRIPTION

Figure 1A:
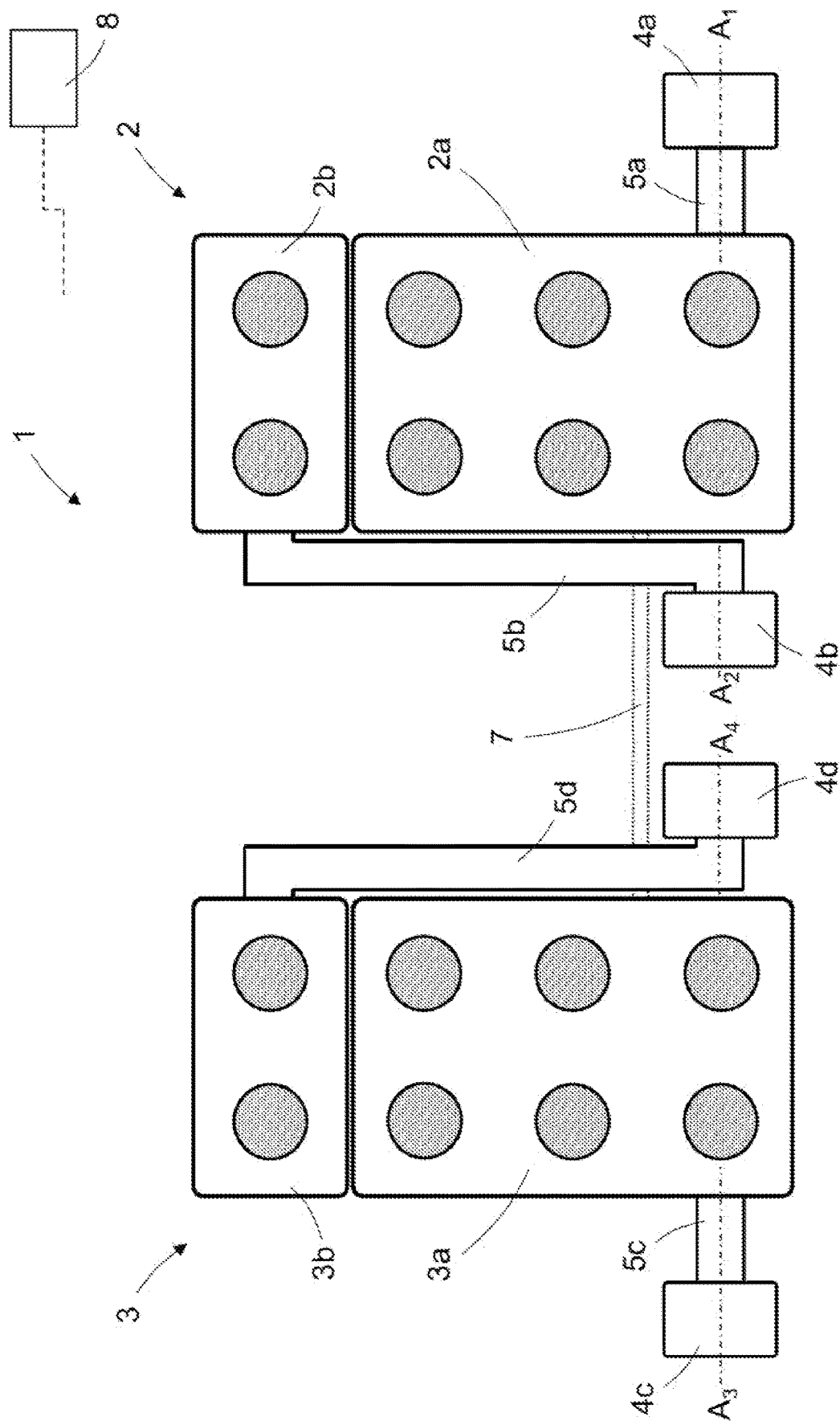
FIGS. 1A-1C show schematically, a front view and side views of a pedal system according to the disclosure.

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

The disclosure concerns a pedal system 1 for a vehicle, where the vehicle is configured for operating in a first vehicle mode $M_{V1}$ for flight operational use and a second vehicle mode $M_{V2}$ for road operational use. The pedal system 1 comprises a first pedal arrangement 2, and the pedal system 1 may further comprise a second pedal arrangement 3. A control unit 8 may be connected to the pedal system 1 for controlling different system functions, and the control unit 8 may comprise one or more processors and one or more memories with necessary software and software applications.

With flight operational use is meant that the vehicle is configured in the first vehicle mode $M_{V1}$ for air or flight use, operating as an aircraft. Operation of the vehicle during taxiing, take off, and landing is included in the flight operational use, and during these operations the vehicle is configured in the first vehicle mode $M_{V1}$. With road operational use is meant that the vehicle is configured in the second vehicle mode $M_{V2}$ for road use, operating as a road vehicle. In the road operational use, the vehicle is operated as a road vehicle, such as a for example a car, on roads or other suitable areas.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

The type of vehicle configured for operating in the first vehicle mode $M_{V1}$ for flight operational use and the second vehicle mode $M_{V2}$ for road operational use, may for example be a flying car. Flying cars are designed to operate as an aircraft in the first vehicle mode $M_{V1}$ and as a car in the second vehicle mode $M_{V2}$. The flying car may have different systems for changing the configuration of the vehicle between the different modes, such as for example retracting or deploying wings, and changing the cockpit layout for the driver of the vehicle. The flying car is often configured as an airplane in the first vehicle mode $M_{V1}$, and the pedals on airplanes commonly have a setup with dual functions different from road operational use vehicles, such as cars. In airplanes, the pedal system commonly comprises a left pedal arrangement and a right pedal arrangement with a side rudder function in the bottom part of each pedal arrangement and a brake function in a top part of each pedal arrangement. The airplane pedal setup is suitable for flying cars when operating in the first vehicle mode $M_{V1}$ for flight operational use.

Figure 1C:
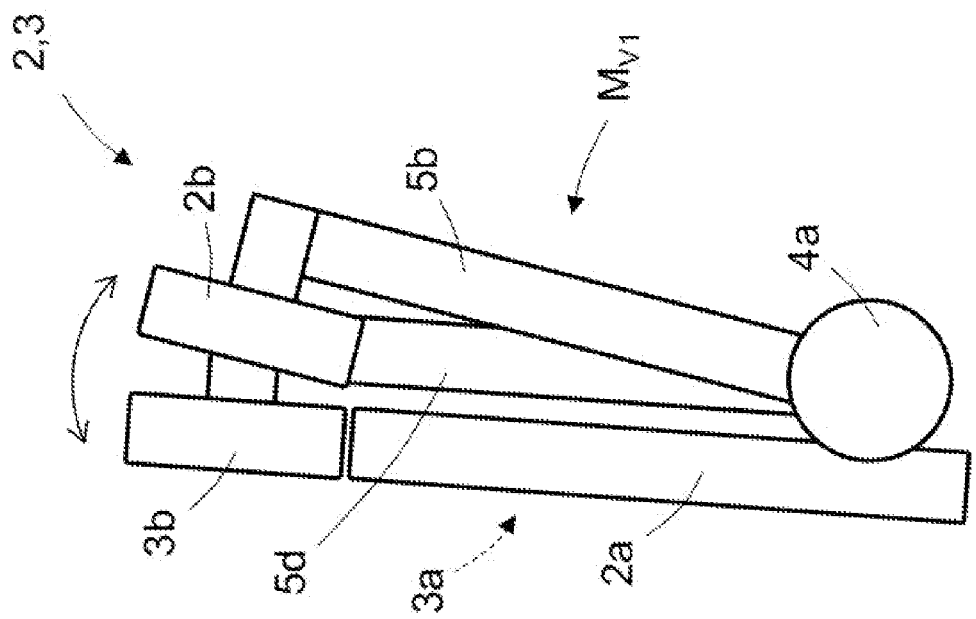
Figure 1B:
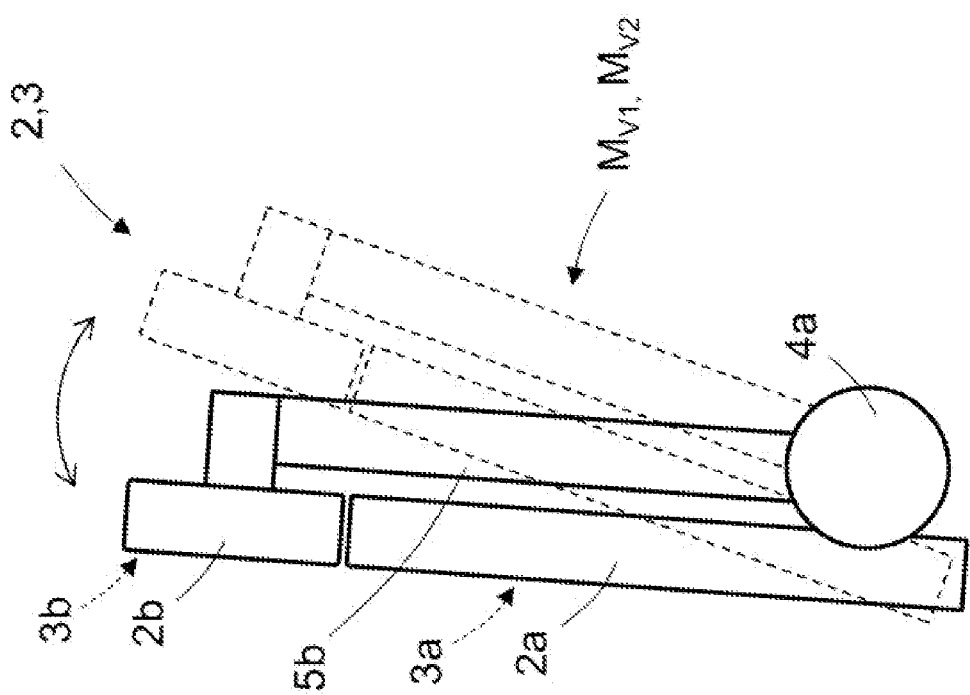

In the embodiment illustrated in FIGS. 1A-1C, the pedal system 1 is schematically shown. In FIG. 1A, the pedal system is shown in a front view as seen by the driver of the vehicle, and in FIGS. 1B-1C the pedal system is shown in side views. As described above, the pedal system 1 is arranged in a vehicle configured for operating in a first vehicle mode $M_{V1}$ for flight operational use and a second vehicle mode $M_{V2}$ for road operational use. The pedal system 1 comprises the first pedal arrangement 2, and as illustrated in FIGS. 1A-1C, the first pedal arrangement 2 comprises a first lower pedal part 2a and a first upper pedal part 2b arranged in connection to each other. In the first vehicle mode $M_{V1}$, the first lower pedal part 2a is configured for activating a rudder function of the vehicle, and the first upper pedal part 2b is configured for activating a braking function of the vehicle. With this pedal setup in the first vehicle mode $M_{V1}$, the first pedal arrangement 2 is configured as well-known conventional airplane pedal arrangements with combined rudder and brake functions. In the second vehicle mode $M_{V2}$, the first lower pedal part 2a and the first upper pedal part 2b are configured for cooperating with each other to activate a throttle function of the vehicle, similar to a throttle pedal function of a car or other road vehicle. As shown in FIG. 1a, the first pedal arrangement 2 is configured as a right pedal arrangement of the vehicle pedal system 1.

In the embodiment illustrated in FIGS. 1A-1C, the first lower pedal part 2a and the first upper pedal part 2b are movably arranged in relation to each other in the first vehicle mode $M_{V1}$, and the first lower pedal part 2a and the first upper pedal part 2b are configured for being displaced in relation to each other in the first vehicle mode $M_{V1}$ for activating the braking function, as schematically shown in FIG. 1C. The first upper pedal part 2b can thus be displaced in relation to the first lower pedal part 2a for a braking action in the first vehicle mode $M_{V1}$. In FIG. 1C, the first upper pedal part 2b has been displaced into a braking position in relation to the first lower pedal part 2a. The first lower pedal part 2a and the first upper pedal part 2b are non-movably arranged in relation to each other in the second vehicle mode $M_{V2}$, and the first lower pedal part 2a and the first upper pedal part 2b are configured for being displaced as a single pedal unit in the second vehicle mode $M_{V2}$. When the driver of the vehicle in the second vehicle mode $M_{V2}$ is pushing the first pedal arrangement 2, the first upper pedal part 2b and the first lower pedal part 2a are being displaced as one single pedal unit, as schematically shown in FIG. 1B with dotted lines, even if the first pedal arrangement 2 comprises two pedal parts. The movement of the pedal parts in the second vehicle mode $M_{V2}$ is through the displacement as one single pedal unit acting as one pedal in the same way as a throttle pedal of a car or other road vehicle.

The first lower pedal part 2a is connected to a first electric actuator 4a and the first upper pedal part 2b is connected to a second electric actuator 4b, as schematically shown in FIGS. 1A-1C. The first lower pedal part 2a and the first upper pedal part 2b are configured for being electrically controlled independently of each other upon activation in the first vehicle mode $M_{V1}$, and the first lower pedal part 2a and the first upper pedal part 2b are configured for being electrically controlled interdependently of each other upon activation in the second vehicle mode $M_{V2}$. The first and second electric actuators may be of any suitable type for pedal actuation, such as for example electric motors. The actuators used should provide suitable resistance and movement when the respective pedal parts are being displaced, and measure how much force is placed on the pedals. The actuators should further measure the amount of displacement of the respective pedal part for providing correct pedal displacement information to the control unit 8. Suitable actuators may for example be electric motors with angular measurement possibilities. In an alternative embodiment, suitable displacement sensors may instead be used for measuring the amount of displacement of the pedal parts. The displacement sensors may for example be arranged as a sensor measuring the distance between the sensor and the pedal part by detecting the amount of displacement. Suitable displacement sensors may for example be optical displacement sensors, linear position sensors, and ultrasonic displacement sensors. To accomplish a synchronized movement of the pedal parts in the second vehicle mode $M_{V2}$, the second electric actuator 4b may for example be programmed to follow the movement of the first electric actuator 4a.

In the embodiment illustrated in FIGS. 1A-1C, the first lower pedal part 2a is pivotally connected to the first electric actuator 4a via a first connection member 5a. The first lower pedal part 2a is configured to rotate around a first rotational axis $A_1$ upon activation, as shown in FIGS. 1A-1B. The first connection member 5a is arranged as a rotating shaft structure connected to and extending between the first lower pedal part 2a and the first electric actuator 4a. The shaft structure is made of a suitable material, such as for example aluminium, steel, plastic materials, composite materials or a combination of different materials, and may have a hollow or solid configuration. The first connection member 5a is rotatably attached to the first electric actuator 4a, and upon activation of the first lower pedal part 2a, the first connection member 5a is rotating around the first rotational axis A1. The first upper pedal part 2b is pivotally connected to the second electric actuator 4b via a second connection member 5b. The first upper pedal part 2b is configured to rotate around a second rotational axis $A_2$ upon activation. The second connection member 5b is arranged as a pivoting lever structure connected to and extending between the first upper pedal part 2b and the second electric actuator 4b. The lever structure is made of a suitable material, such as for example aluminium, steel, plastic materials, composite materials or a combination of different materials, and may have a hollow or solid configuration. The second connection member 5b is pivotally attached to the second electric actuator 4b, and upon activation of the first upper pedal part 2b, the second connection member 5b is pivoting around the second rotational axis $A_2$, as indicated in FIG. 1C. It should be understood that the respective connection members may have other suitable configurations and designs.

In the embodiment illustrated in FIGS. 1A-1C, the first rotational axis $A_1$ is parallel to, or essentially parallel to, the second rotational axis $A_2$. The first rotational axis $A_1$ and the second rotational axis $A_2$ are coaxially arranged in relation to each other, and the first lower pedal part 2a and the first upper pedal part 2b are configured to work as one pedal unit following a path corresponding to a pivoting movement around the first rotational axis $A_1$ and the second rotational axis $A_2$ in the second vehicle mode $M_{V2}$, as shown in FIG. 1B.

When only pushing the first lower pedal part 2a for the rudder function in the first vehicle mode $M_{V1}$, the first upper pedal part 2b may suitably be configured to follow the movement of the first lower pedal part 2a, as schematically illustrated in FIG. 1B. In this way, the first pedal arrangement 2 is configured as a single pedal unit during flight. The first lower pedal part 2a and the first upper pedal part 2b may thus be configured for being displaced as a single pedal unit also in the first vehicle mode $M_{V1}$. When the driver of the vehicle in the first vehicle mode $M_{V1}$ is pushing the first lower pedal part 2a, the first upper pedal part 2b and the first lower pedal part 2a may be displaced as one single pedal unit, as schematically shown in FIG. 1B, even if the first pedal arrangement 2 comprises two pedal parts. To accomplish a synchronized movement of the pedal parts in the first vehicle mode $M_{V1}$, the second electric actuator 4b may for example be programmed to follow the movement of the first electric actuator 4a. By pushing the first upper pedal part 2b in relation to the first lower pedal part 2a, a braking action is established.

In the embodiment schematically illustrated in FIGS. 1A-1C, the pedal system 1 further comprises the second pedal arrangement 3. The second pedal arrangement 3 comprises a second lower pedal part 3a and a second upper pedal part 3b arranged in connection to each other. In the first vehicle mode $M_{V1}$, the second lower pedal part 3a is configured for activating a rudder function of the vehicle, and the second upper pedal part 3b is configured for activating a braking function of the vehicle. With this pedal setup in the first vehicle mode $M_{V1}$, the second pedal arrangement 3 is configured as well-known conventional airplane pedal arrangements with combined rudder and brake functions. In the second vehicle mode $M_{V2}$, the second lower pedal part 3a and the second upper pedal part 2b are configured for cooperating with each other to activate a braking function of the vehicle, similar to a brake pedal function of a car or other road vehicle. As shown in FIG. 1a, the second pedal arrangement 3 is configured as a left pedal arrangement of the vehicle pedal system 1.

In the embodiment illustrated in FIGS. 1A-1C, the second lower pedal part 3a and the second upper pedal part 3b are movably arranged in relation to each other in the first vehicle mode $M_{V1}$, and the second lower pedal part 3a and the second upper pedal part 3b are configured for being displaced in relation to each other in the first vehicle mode $M_{V1}$ for activating the braking function. The second upper pedal part 3b can thus be displaced in relation to the second lower pedal part 3a for a braking action in the first vehicle mode $M_{V1}$, in the same way as described above in relation to the first pedal arrangement 2 and shown in FIG. 1C. The second lower pedal part 3a and the second upper pedal part 3b are non-movably arranged in relation to each other in the second vehicle mode $M_{V2}$, and the second lower pedal part 3a and the second upper pedal part 3b are configured for being displaced as a single pedal unit in the second vehicle mode $M_{V2}$, in the same way as described above in relation to the first pedal arrangement 2 and shown in FIG. 1B. When the driver of the vehicle in the second vehicle mode $M_{V2}$ is pushing the second pedal arrangement 3, the second upper pedal part 3b and the second lower pedal part 3a are being displaced as one single pedal unit, even if the second pedal arrangement 3 comprises two pedal parts. The movement of the pedal parts in the second vehicle mode $M_{V2}$ is through the displacement as one single pedal unit acting as one pedal in the same way as a brake pedal of a car or other road vehicle.

The second lower pedal part 3a is connected to a third electric actuator 4c and the second upper pedal part 3b is connected to a fourth electric actuator 4d, as schematically shown in FIG. 1a. The second lower pedal part 3a and the second upper pedal part 3b are configured for being electrically controlled independently of each other upon activation in the first vehicle mode $M_{V1}$, and the second lower pedal part 3a and the second upper pedal part 3b are configured for being electrically controlled interdependently of each other upon activation in the second vehicle mode $M_{V2}$. The third and fourth electric actuators may be of any suitable type for pedal actuation, such as for example electric motors. The actuators used should provide suitable resistance and movement when the respective pedal parts are being displaced, and measure how much force is placed on the pedals. The actuators should further measure the amount of displacement of the respective pedal part for providing correct pedal displacement information to the control unit 8. Suitable actuators may for example be electric motors with angular measurement possibilities. In an alternative embodiment, suitable displacement sensors may instead be used for measuring the amount of displacement of the pedal parts. The displacement sensors may for example be arranged as a sensor measuring the distance between the sensor and the pedal part by detecting the amount of displacement. Suitable displacement sensors may for example be optical displacement sensors, linear position sensors, and ultrasonic displacement sensors. To accomplish a synchronized movement of the pedal parts in the second vehicle mode $M_{V2}$, the fourth electric actuator 4d may for example be programmed to follow the movement of the third electric actuator 4c.

In the embodiment illustrated in FIGS. 1A-1C, the second lower pedal part 3a is pivotally connected to the third electric actuator 4c via a third connection member 5c. The second lower pedal part 3a is configured to rotate around a third rotational axis $A_3$ upon activation. The third connection member 5c is arranged as a rotating shaft structure connected to and extending between the second lower pedal part 3a and the third electric actuator 4c. The shaft structure is made of a suitable material, such as for example aluminium, steel, plastic materials, composite materials or a combination of different materials, and may have a hollow or solid configuration. The third connection member 5c is rotatably attached to the third electric actuator 4c, and upon activation of the second lower pedal part 3a, the third connection member 5c is rotating around the third rotational axis $A_3$. The second upper pedal part 3b is pivotally connected to the fourth electric actuator 4d via a fourth connection member 5d. The second upper pedal part 3b is configured to rotate around a fourth rotational axis $A_4$ upon activation. The fourth connection member 5d is arranged as a pivoting lever structure connected to and extending between the second upper pedal part 3b and the fourth electric actuator 4d. The lever structure is made of a suitable material, such as for example aluminium, steel, plastic materials, composite materials or a combination of different materials, and may have a hollow or solid configuration. The fourth connection member 5d is pivotally attached to the fourth electric actuator 4d, and upon activation of the second upper pedal part 3b, the fourth connection member 5d is pivoting around the fourth rotational axis $A_4$. It should be understood that the respective connection members may have other suitable configurations and designs.

In the embodiment illustrated in FIGS. 1A-1C, the third rotational axis $A_3$ is parallel to, or essentially parallel to, the fourth rotational axis $A_4$. The third rotational axis $A_3$ and the fourth rotational axis $A_4$ are coaxially arranged in relation to each other, and the second lower pedal part 3a and the second upper pedal part 3b are configured to work as one pedal unit following a path corresponding to a pivoting movement around the third rotational axis $A_3$ and the fourth rotational axis $A_4$ in the second vehicle mode $M_{V2}$.

When only pushing the second lower pedal part 3a for the rudder function in the first vehicle mode $M_{V1}$, the second upper pedal part 3b may suitably be configured to follow the movement of the second lower pedal part 3a, in the same way as described above in relation to the first pedal arrangement 2. In this way, the second pedal arrangement 3 is configured as a single pedal unit during flight. The second lower pedal part 3a and the second upper pedal part 3b may thus be configured for being displaced as a single pedal unit also in the first vehicle mode $M_{V1}$. When the driver of the vehicle in the first vehicle mode $M_{V1}$ is pushing the second lower pedal part 3a, the second upper pedal part 3b and the second lower pedal part 3a may be displaced as one single pedal unit, in the same way as described above and schematically shown for the first pedal arrangement 2 in FIG. 1B, even if the second pedal arrangement 3 comprises two pedal parts. To accomplish a synchronized movement of the pedal parts in the first vehicle mode $M_{V1}$, the fourth electric actuator 4d may for example be programmed to follow the movement of the third electric actuator 4c. By pushing the second upper pedal part 3b in relation to the second lower pedal part 3a, a braking action is established.

Figure 2A:
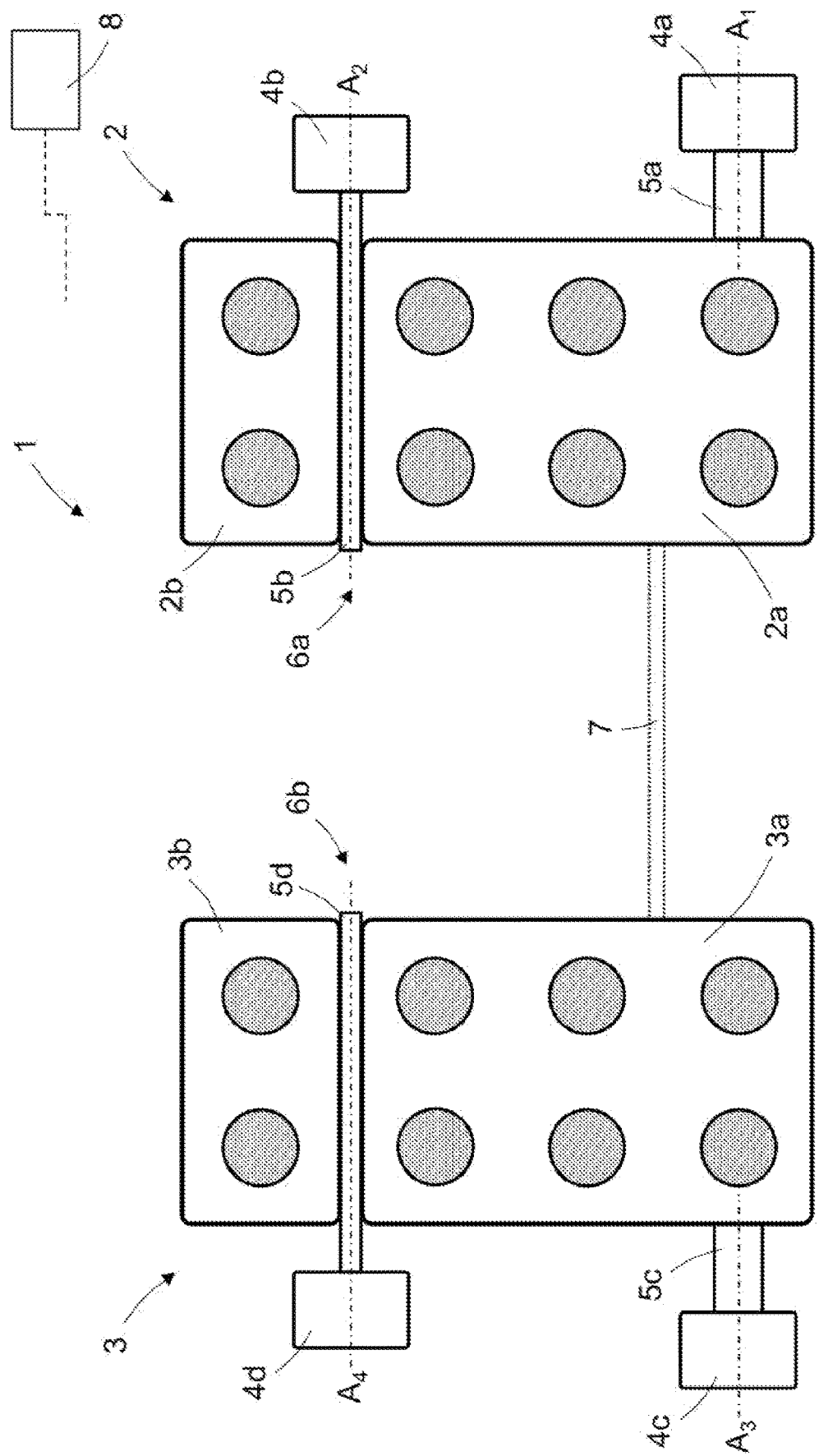
FIGS. 2A-2C show schematically, a front view and side views of a pedal system according another embodiment of the disclosure.
Figure 2C:
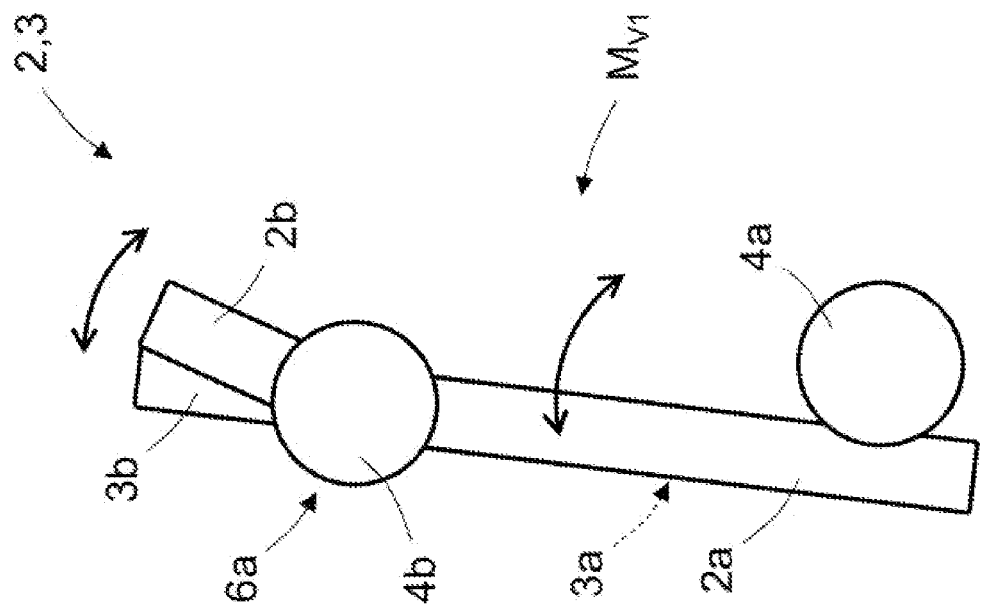
Figure 2B:
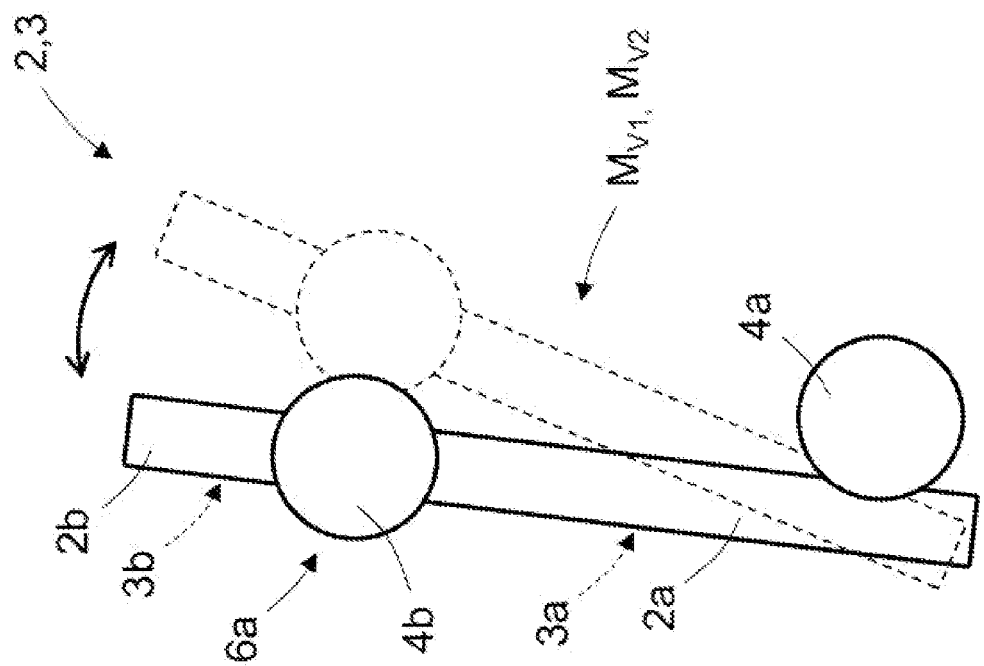

In an alternative embodiment illustrated in FIGS. 2A-2C, the pedal parts of the pedal system 1 arranged in a vehicle configured for operating in the first vehicle mode $M_{V1}$ for flight operational use and the second vehicle mode $M_{V2}$ for road operational use are differently arranged in relation to each other. The pedal system 1 comprises the first pedal arrangement 2, and as illustrated in FIGS. 2A-2C, the first pedal arrangement 2 comprises the first lower pedal part 2a and the first upper pedal part 2b arranged in connection to each other, in a similar way as described in connection to the embodiment above. In the first vehicle mode $M_{V1}$, the first lower pedal part 2a is configured for activating a rudder function of the vehicle, and the first upper pedal part 2b is configured for activating a braking function of the vehicle. In the second vehicle mode $M_{V2}$, the first lower pedal part 2a and the first upper pedal part 2b are configured for cooperating with each other to activate a throttle function of the vehicle. As shown in FIG. 2A, the first pedal arrangement 2 is configured as a right pedal arrangement of the vehicle pedal system 1.

In the embodiment illustrated in FIGS. 2A-2C, the first lower pedal part 2a and the first upper pedal part 2b are movably arranged in relation to each other in the first vehicle mode $M_{V1}$, and the first lower pedal part 2a and the first upper pedal part 2b are configured for being displaced in relation to each other in the first vehicle mode $M_{V1}$ for activating the braking function, as schematically shown in FIG. 2C. In FIG. 2C, the first upper pedal part 2b has been displaced in relation to the first lower pedal part 2a into a braking position. The first lower pedal part 2a and the first upper pedal part 2b are non-movably arranged in relation to each other in the second vehicle mode $M_{V2}$, and the first lower pedal part 2a and the first upper pedal part 2b are configured for being displaced as a single pedal unit in the second vehicle mode $M_{V2}$, as schematically shown in FIG. 2B with dotted lines.

In the embodiment illustrated in FIGS. 2A-2C, the first lower pedal part 2a is pivotally connected to the first electric actuator 4a via the first connection member 5a in the same way and with the same function as described in the embodiment above. The first lower pedal part 2a is configured to rotate around the first rotational axis $A_1$ upon activation, both in the first vehicle mode $M_{V1}$ and the second vehicle mode $M_{V2}$. The first connection member 5a is arranged as a rotating shaft structure connected to and extending between the first lower pedal part 2a and the first electric actuator 4a. In this alternative embodiment, the first lower 2a part is pivotally connected to the first upper pedal part 2b via the second connection member 5b. The first upper pedal part 2b is connected to the second electric actuator 4b, as schematically shown in FIGS. 2A-2C. The first lower pedal part 2a and the first upper pedal part 2b are configured for being electrically controlled independently of each other upon activation in the first vehicle mode $M_{V1}$, and the first lower pedal part 2a and the first upper pedal part 2b are configured for being electrically controlled interdependently of each other upon activation in the second vehicle mode $M_{V2}$. The first and second electric actuators may be of any suitable type for pedal actuation, and sensors may be used for measuring the pedal displacements, as described in the embodiment above.

In the embodiment shown in FIGS. 2A-2C, the first upper pedal part 2b is pivotally connected to the second electric actuator 4b via the second connection member 5b, where the second connection member 5b is arranged between the first upper pedal part 2b and the first lower pedal part 2a. The first upper pedal part 2b is upon activation in the first vehicle mode $M_{V1}$ configured to rotate around a second rotational axis $A_2$, in relation to the first lower pedal part 2a, as illustrated in FIG. 2C. The second connection member 5b is arranged as a hinge structure or other suitable arrangement connected to and arranged between the first upper pedal part 2b and the first lower pedal part 2a. The second electric actuator 4b is connected to the second connection member 5b. The second connection member 5b is pivotally attached to the second electric actuator 4b, and upon activation of the first upper pedal part 2b in the first vehicle mode $M_{V1}$, the first upper pedal part 2b is pivoting around the second rotational axis $A_2$ in relation to the first lower pedal part 2a, and the second electric actuator 4b is establishing the displacement function of the first upper pedal part 2a in relation to the first lower pedal part 2b when being pushed.

In the illustrated embodiment, the first rotational axis $A_1$ is parallel to, or essentially parallel to, the second rotational axis $A_2$.

In the embodiment shown in FIGS. 2A-2C, the first pedal arrangement 2 further comprises a first locking mechanism 6a, where the first locking mechanism 6a is configured for allowing a pivotal movement between the first lower pedal part 2a and the first upper pedal part 2b in the first vehicle mode $M_{V1}$. The first locking mechanism 6a is configured for preventing a pivotal movement between the first lower pedal part 2a and the first upper pedal part 2b in the second vehicle mode $M_{V2}$. The first lower pedal part 2a and the first upper pedal part 2b are configured to work as one pedal unit following a path corresponding to a pivoting movement around the first rotational axis $A_1$ in the second vehicle mode $M_{V2}$. The first locking mechanism 6a may for example be arranged as a locking pin that is activated between the first lower pedal part 2a and the first upper pedal part 2b in the second vehicle mode $M_{V2}$. In an alternative embodiment, the second electric actuator 4b may form the first locking mechanism 6a, where the second electric actuator 4b is programmed to prevent movement between the first lower pedal part 2a and the first upper pedal part 2b in the second vehicle mode $M_{V2}$.

When pushing the first lower pedal part 2a for the rudder function in the first vehicle mode $M_{V1}$, the first upper pedal part 2b will follow the movement of the first lower pedal part 2a, due to the pedal configuration, as shown in FIG. 2B. The first lower pedal part 2a and the first upper pedal part 2b may thus be configured for being displaced as a single pedal unit also in the first vehicle mode $M_{V1}$, if no braking action is applied. By pushing the first upper pedal part 2b in relation to the first lower pedal part 2a, a braking action is established, in the same way as illustrated in FIG. 2C.

In the alternative embodiment illustrated in FIGS. 2A-2C, the pedal system 1 further comprises the second pedal arrangement 3. The second pedal arrangement 3 comprises the second lower pedal part 3a and the second upper pedal part 3b arranged in connection to each other, in a similar way as described in connection to the first pedal arrangement 2. In the first vehicle mode $M_{V1}$, the second lower pedal part 3a is configured for activating a rudder function of the vehicle, and the second upper pedal part 3b is configured for activating a braking function of the vehicle. In the second vehicle mode $M_{V2}$, the second lower pedal part 3a and the second upper pedal part 3b are configured for cooperating with each other to activate a braking function of the vehicle. As shown in FIG. 2a, the second pedal arrangement 3 is configured as a left pedal arrangement of the vehicle pedal system 1.

In the embodiment illustrated in FIGS. 2A-2C, the second lower pedal part 3a and the second upper pedal part 3b are movably arranged in relation to each other in the first vehicle mode $M_{V1}$, and the second lower pedal part 3a and the second upper pedal part 3b are configured for being displaced in relation to each other in the first vehicle mode $M_{V1}$ for activating the braking function, in the same way as described in relation to the first pedal arrangement 2 and shown in FIG. 2C. The second lower pedal part 3a and the second upper pedal part 3b are non-movably arranged in relation to each other in the second vehicle mode $M_{V2}$, and the second lower pedal part 3a and the second upper pedal part 3b are configured for being displaced as a single pedal unit in the second vehicle mode $M_{V2}$, in the same way as described in relation to the first pedal arrangement 2 and shown in FIG. 2B.

In the embodiment illustrated in FIGS. 2A-2C, the second lower pedal part 3a is pivotally connected to the third electric actuator 4c via the third connection member 5c in the same way and with the same function as described in the embodiment above. The second lower pedal part 3a is configured to rotate around the third rotational axis $A_3$ upon activation, both in the first vehicle mode $M_{V1}$ and the second vehicle mode $M_{V2}$. The third connection member 5c is arranged as a rotating shaft structure connected to and extending between the second lower pedal part 3a and the third electric actuator 4c. In this alternative embodiment, the second lower pedal 3a part is pivotally connected to the second upper pedal part 3b via the fourth connection member 5d. The second upper pedal part 3b is connected to the fourth electric actuator 4d, as schematically shown in FIG. 2A. The second lower pedal part 3a and the second upper pedal part 3b are configured for being electrically controlled independently of each other upon activation in the first vehicle mode $M_{V1}$, and the second lower pedal part 3a and the second upper pedal part 3b are configured for being electrically controlled interdependently of each other upon activation in the second vehicle mode $M_{V2}$. The third and fourth electric actuators may be of any suitable type for pedal actuation, and sensors may be used for measuring the pedal displacements, as described in the embodiment above.

In the embodiment shown in FIGS. 2A-2C, the second upper pedal part 3b is pivotally connected to the fourth electric actuator 4d via the fourth connection member 5d, where the fourth connection member 5d is arranged between the second upper pedal part 3b and the second lower pedal part 3a. The second upper pedal part 3b is upon activation in the first vehicle mode $M_{V1}$ configured to rotate around a fourth rotational axis A4, in relation to the second lower pedal part 3a. The fourth connection member 5d is arranged as a hinge structure or other suitable arrangement connected to and arranged between the second upper pedal part 3b and the second lower pedal part 3a. The fourth electric actuator 4d is connected to the fourth connection member 5d. The fourth connection member 5d is pivotally attached to the fourth electric actuator 4d, and upon activation of the second upper pedal part 3b in the first vehicle mode $M_{V1}$, the second upper pedal part 3a is pivoting around the fourth rotational axis $A_4$ in relation to the second lower pedal part 3a, and the fourth electric actuator 4d is establishing the displacement function of the second upper pedal part 3a in relation to the second lower pedal part 3b when being pushed. In the illustrated embodiment, the third rotational axis $A_3$ is parallel to, or essentially parallel to, the fourth rotational axis $A_4$.

In the embodiment shown in FIGS. 2A-2C, the second pedal arrangement 3 further comprises a second locking mechanism 6b, where the second locking mechanism 6b is configured for allowing a pivotal movement between the second lower pedal part 3a and the second upper pedal part 3b in the first vehicle mode $M_{V1}$. The second locking mechanism 6b is configured for preventing a pivotal movement between the second lower pedal part 3a and the second upper pedal part 3b in the second vehicle mode $M_{V2}$. The second lower pedal part 3a and the second upper pedal part 3b are configured to work as one pedal unit following a path corresponding to a pivoting movement around the third rotational axis A3 in the second vehicle mode $M_{V2}$. The second locking mechanism 6b may for example be arranged as a locking pin that is activated between the second lower pedal part 3a and the second upper pedal part 3b in the second vehicle mode $M_{V2}$. In an alternative embodiment, the fourth electric actuator 4d may form the second locking mechanism 6b, where the fourth electric actuator 4d is programmed to prevent movement between the first lower pedal part 2a and the first upper pedal part 2b in the second vehicle mode $M_{V2}$.

When pushing the second lower pedal part 3a for the rudder function in the first vehicle mode $M_{V1}$, the second upper pedal part 3b will follow the movement of the second lower pedal part 3a, due to the pedal configuration. The second lower pedal part 3a and the second upper pedal part 3b may thus be configured for being displaced as a single pedal unit also in the first vehicle mode $M_{V1}$, if no braking action is applied. By pushing the second upper pedal part 3b in relation to the second lower pedal part 3a, a braking action is established, in the same way as illustrated for the first pedal arrangement 2 in FIG. 2C.

The actuators in the different embodiments described may be directly or indirectly connected to a floor structure or other suitable structure of the vehicle, where applicable.

In the different embodiments illustrated in FIGS. 1A-1C and 2A-2C, the first pedal arrangement 2 and the second pedal arrangement 3 are operatively connected to each other via a connection device 7. In the first vehicle mode $M_{V1}$, the second pedal arrangement 3 upon displacement of the first pedal arrangement 2 is configured for being displaced with the connection device 7 in response to the displacement of the first pedal arrangement 2. In the first vehicle mode $M_{V1}$, the first pedal arrangement 2 upon displacement of the second pedal arrangement 3 is configured for being displaced with the connection device 7 in response to the displacement of the second pedal arrangement 3. The connection device 7 may for example be configured as an electric control device that is linked to or being part of the control unit 8, which together with the electric actuators and the control unit 8 is controlling the movements of the pedal arrangements in response to each other. When the driver of the vehicle in the first vehicle mode $M_{V1}$ is pushing the first pedal arrangement 2 in a direction away from the driver for a rudder function, the second pedal arranged 3 is moved in a direction towards the driver. When the driver of the vehicle in the first vehicle mode $M_{V1}$ is pushing the second pedal arrangement 3 in a direction away from the driver for a rudder function, the first pedal arrangement 2 is moved in a direction towards the driver. These pedal movement configurations are the same as in conventional airplanes. The pedal arrangements may pivot around the respective rotational axes during the movements. The connection device 7 is efficiently establishing the connection between the pedal arrangements for securing the displacement of the respective pedal arrangement during flight operational use. The connection device 7 is securing the same operation of the pedals in the first vehicle mode for flight operational use, as in conventional airplanes. When the first pedal arrangement 2 is pushed by a user, the second pedal arrangement 3 is moved in the opposite direction. When the second pedal arrangement 3 is pushed by the user, the first pedal arrangement 2 is moved in the opposite direction.

Figure 3A:
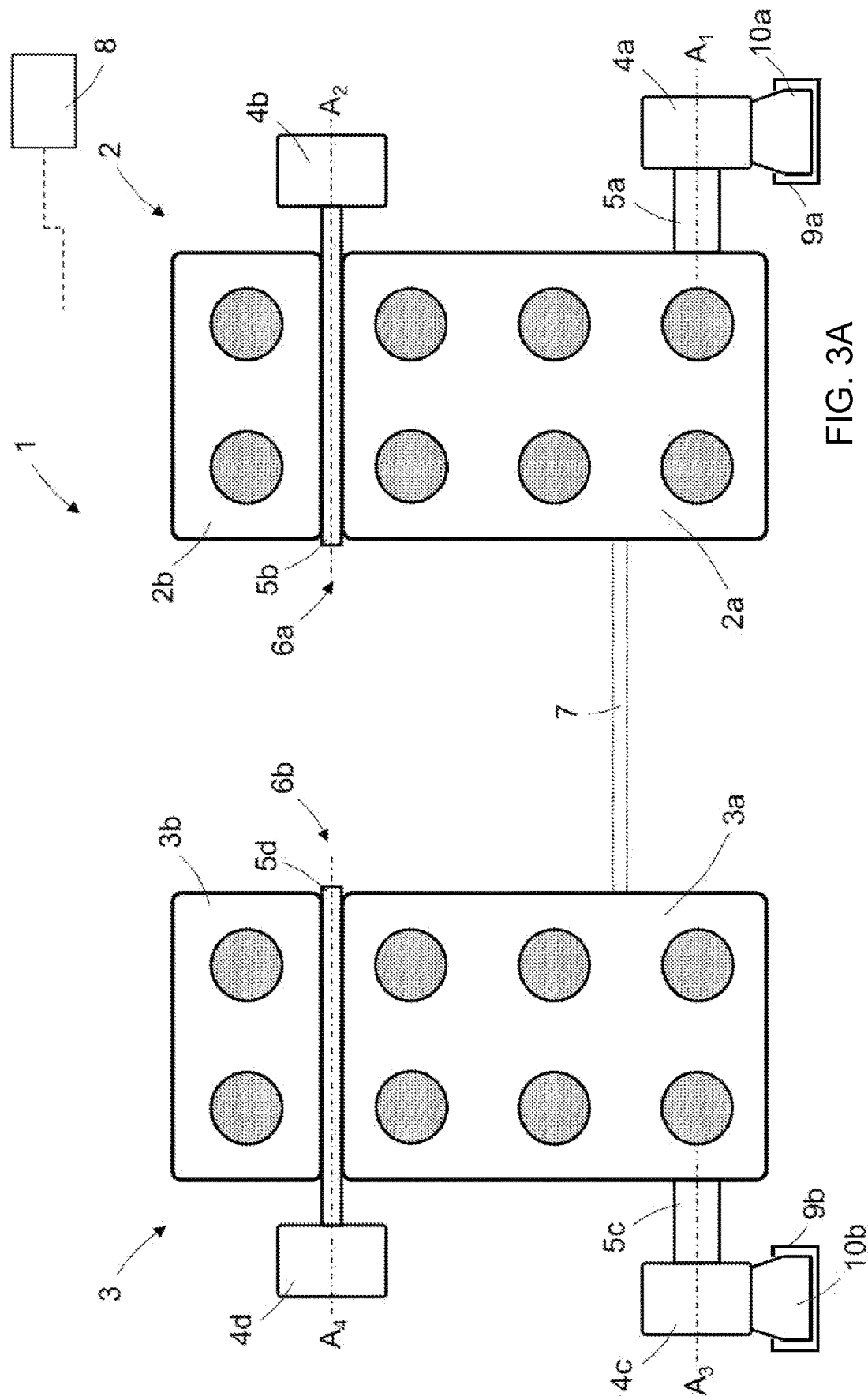
FIGS. 3A-3B show schematically, a front view and a side view of a pedal system according another embodiment of the disclosure.
Figure 3B:
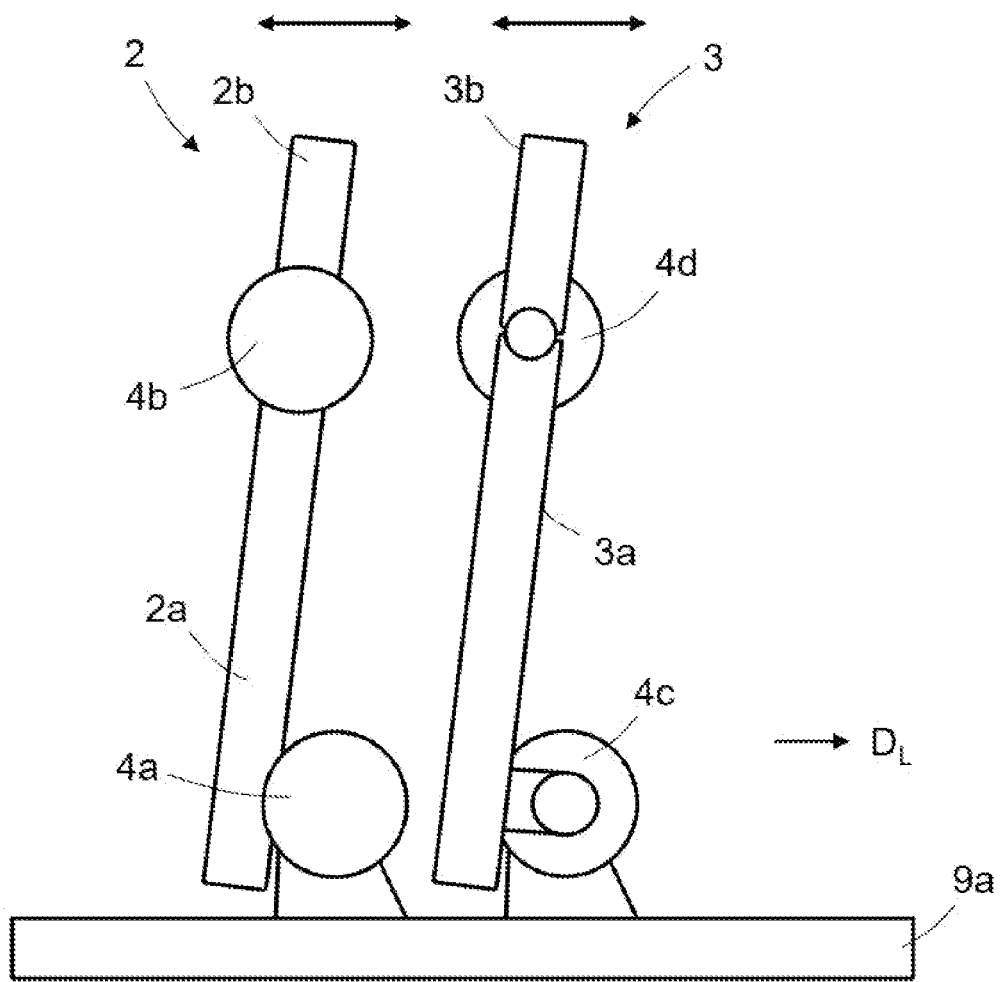

In an alternative embodiment illustrated in FIGS. 3A-3B, the pedal system 1 is instead arranged on tracks for allowing the opposite movements of the first pedal arrangement 2 and the second pedal arrangement 3 with the connection member 7 in the first vehicle mode $M_{V1}$. The first pedal arrangement 2 is arranged on a first track 9a and the second pedal arrangement 3 is arranged on a second track 9b. The tracks are extending in a longitudinal vehicle direction $D_L$, as schematically illustrated in FIG. 3B, and the tracks are connected to a floor structure or other suitable vehicle structure. The pedal arrangements may have the configurations described in the embodiments above, or have any suitable alternative configuration providing the same functionality. In the embodiment illustrated in FIGS. 3A-3B, the first pedal arrangement 2 and the second pedal arrangement 3 are configured in the same way as illustrated in and described in conjunction with FIGS. 2A-2C. In the embodiment shown in FIGS. 3A-3B, the first actuator 4a is connected to the first track 9a via a first track member 10a, and the first lower pedal 2a is arranged to pivot around the first rotational axis $A_1$ in relation to the first track 9a. The third actuator 4c is connected to the second track 9b via a second track member 10b, and the second lower pedal 3a is arranged to pivot around the third rotational axis $A_3$ in relation to the second track 9b. The first track member 10a and the second track member 10b are arranged to slide longitudinally in opposite directions along the respective tracks upon activation of the pedals, and may have any suitable configurations. The connection member 7 is operatively connecting the first pedal arrangement 2 and the second pedal arrangement 3. The connection member 7 may be a mechanical arrangement connecting the two pedal arrangements, which is establishing the longitudinal movements in opposite directions. The connection member 7 may alternative be constituted by each track with corresponding track member, where the track and corresponding track member are forming parts of an electric linear actuator connected to the control unit 8. With this arrangement, the linear actuator is electrically controlling the displacements of the pedal arrangements in the opposite directions. In the second vehicle mode $M_{V2}$, the first pedal arrangement 2 is prevented from moving in relation to the first track 9a, and the second pedal arrangement 3 is prevented from moving in relation to the second track 9b. The pedal system may for example be provided with suitable locking means for preventing the opposite movements of the pedal arrangements in the second vehicle mode $M_{V2}$, or alternatively the actuators used may prevent the opposite movements of the pedal arrangements in the second vehicle mode $M_{V2}$. The prevention of the longitudinal movements of the pedal arrangements along the respective tracks is securing a suitable configuration of the pedals for road operational use in the second vehicle mode $M_{V2}$.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the pedal system 1, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors arranged on the vehicle surface, an off-site server, or a cloud-based server.

The processor or processors associated with the pedal system 1 may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1: Pedal system
2: First pedal arrangement
2a: First lower pedal part
2b: First upper pedal part
3: Second pedal arrangement
3a: Second lower pedal part
3b: Second upper pedal part
4a: First electric actuator
4b: Second electric actuator
4c: Third electric actuator
4d: Fourth electric actuator
5a: First connection member
5b: Second connection member
5c: Third connection member
5d: Fourth connection member
6a: First locking mechanism
6b: Second locking mechanism
7: Connection device
8: Control unit
9a: First track
9b: Second track
10a: First track member
10b: Second track member

What is claimed is:

1. A pedal system for a vehicle, wherein the vehicle is configured for operating in a first vehicle mode for flight operational use and a second vehicle mode for road operational use,
wherein the pedal system comprises a first pedal arrangement having a first lower pedal part and a first upper pedal part arranged in connection to each other,
wherein in the first vehicle mode the first lower pedal part is configured for activating a rudder function of the vehicle, and wherein in the first vehicle mode the first upper pedal part is configured for activating a braking function of the vehicle,
wherein in the second vehicle mode the first lower pedal part and the first upper pedal part are configured for cooperating with each other to activate a throttle function of the vehicle;
wherein the first lower pedal part and the first upper pedal part are movably arranged in relation to each other in the first vehicle mode, wherein the first lower pedal part and the first upper pedal part are configured for being displaced in relation to each other in the first vehicle mode for activating the braking function; and
wherein the first lower pedal part and the first upper pedal part are non-movably arranged in relation to each other in the second vehicle mode, wherein the first lower pedal part and the first upper pedal part are configured for being displaced as a single pedal unit in the second vehicle mode.

2. The pedal system according to claim 1, wherein the first lower pedal part is connected to a first electric actuator and the first upper pedal part is connected to a second electric actuator, wherein the first lower pedal part and the first upper pedal part are configured for being electrically controlled independently of each other upon activation in the first vehicle mode, and wherein the first lower pedal part and the first upper pedal part are configured for being electrically controlled interdependently of each other upon activation in the second vehicle mode.

3. The pedal system according to claim 2, wherein the first lower pedal part is pivotally connected to the first electric actuator via a first connection member, wherein the first lower pedal part is configured to rotate around a first rotational axis upon activation; and wherein the first upper pedal part is pivotally connected to the second electric actuator via a second connection member, wherein the first upper pedal part is configured to rotate around a second rotational axis upon activation.

4. The pedal system according to claim 3, wherein the first rotational axis is parallel to, or essentially parallel to, the second rotational axis.

5. The pedal system according to claim 3, wherein the first rotational axis and the second rotational axis are coaxially arranged in relation to each other, wherein the first lower pedal part and the first upper pedal part are configured to work as one pedal unit following a path corresponding to a pivoting movement around the first rotational axis and the second rotational axis in the second vehicle mode.

6. The pedal system according to claim 3, wherein the first lower pedal part is pivotally connected to the first upper pedal part via the second connection member, wherein the first pedal arrangement further comprises a first locking mechanism, wherein the first locking mechanism is configured for allowing a pivotal movement between the first lower pedal part and the first upper pedal part in the first vehicle mode, and wherein the first locking mechanism is configured for preventing a pivotal movement between the first lower pedal part and the first upper pedal part in the second vehicle mode, wherein the first lower pedal part and the first upper pedal part are configured to work as one pedal unit following a path corresponding to a pivoting movement around the first rotational axis in the second vehicle mode.

7. The pedal system according to claim 1, wherein the pedal system further comprises a second pedal arrangement having a second lower pedal part and a second upper pedal part arranged in connection to each other,
wherein in the first vehicle mode the second lower pedal part is configured for activating a rudder function of the vehicle, and wherein in the first vehicle mode the second upper pedal part is configured for activating a braking function of the vehicle,
wherein in the second vehicle mode the second lower pedal part and the second upper pedal part are configured for cooperating with each other to activate a braking function of the vehicle.

8. The pedal system according to claim 7, wherein the second lower pedal part and the second upper pedal part are movably arranged in relation to each other in the first vehicle mode, wherein the second lower pedal part and the second upper pedal part are configured for being displaced in relation to each other in the first vehicle mode for activating the braking function; and wherein the second lower pedal part and the second upper pedal part are non-movably arranged in relation to each other in the second vehicle mode, wherein the second lower pedal part and the second upper pedal part are configured for being displaced as a single pedal unit in the second vehicle mode.

9. The pedal system according to claim 7, wherein the second lower pedal part is connected to a third electric actuator and the second upper pedal part is connected to a fourth electric actuator, wherein the second lower pedal part and the second upper pedal part are configured for being electrically controlled independently of each other upon activation in the first vehicle mode, and wherein the second lower pedal part and the second upper pedal part are configured for being electrically controlled interdependently of each other upon activation in the second vehicle mode.

10. The pedal system according to claim 9, wherein the second lower pedal part is pivotally connected to the third electric actuator via a third connection member, wherein the second lower pedal part is configured to rotate around a third rotational axis upon activation; and wherein the second upper pedal part is pivotally connected to the fourth electric actuator via a fourth connection member, wherein the second upper pedal part is configured to rotate around a fourth rotational axis upon activation.

11. The pedal system according to claim 10, wherein the third rotational axis is parallel to, or essentially parallel to, the fourth rotational axis.

12. The pedal system according to claim 10, wherein the third rotational axis and the fourth rotational axis are coaxially arranged in relation to each other, wherein the second lower pedal part and the second upper pedal part are configured to work as one pedal unit following a path corresponding to a pivoting movement around the third rotational axis and the fourth rotational axis in the second vehicle mode.

13. The pedal system according to claim 10, wherein the second lower pedal part is pivotally connected to the second upper pedal part via the fourth connection member, wherein the second pedal arrangement further comprises a second locking mechanism, wherein the second locking mechanism is configured for allowing a pivotal movement between the second lower pedal part and the second upper pedal part in the first vehicle mode, and wherein the second locking mechanism is configured for preventing a pivotal movement between the second lower pedal part and the second upper pedal part in the second vehicle mode, wherein the second lower pedal part and the second upper pedal part are configured to work as one pedal unit following a path corresponding to a pivoting movement around the third rotational axis in the second vehicle mode.

14. The pedal system according to claim 7, wherein the first pedal arrangement and the second pedal arrangement are operatively connected to each other via a connection device, wherein in the first vehicle mode the second pedal arrangement upon displacement of the first pedal arrangement is configured for being displaced with the connection device in response to the displacement of the first pedal arrangement, and wherein in the first vehicle mode the first pedal arrangement upon displacement of the second pedal arrangement is configured for being displaced with the connection device in response to the displacement of the second pedal arrangement.

\* \* \* \* \*